United States Patent
Huber, Jr.

(10) Patent No.: US 6,507,307 B1
(45) Date of Patent: Jan. 14, 2003

(54) RAM-AIR INFLATED, PASSIVE DECOY FOR MILLIMETER WAVE FREQUENCIES

(75) Inventor: Joseph C. Huber, Jr., Cuyahoga Falls, OH (US)

(73) Assignee: Lockheed Martin Corporation, Akron, OH (US)

( * ) Notice: Subject to any disclaimer, the term of this patent is extended or adjusted under 35 U.S.C. 154(b) by 0 days.

(21) Appl. No.: 06/457,291

(22) Filed: Dec. 20, 1982

Related U.S. Application Data

(63) Continuation-in-part of application No. 06/378,313, filed on May 14, 1982.

(51) Int. Cl.⁷ ................................................. G01S 7/38
(52) U.S. Cl. ............................. 342/9; 342/12; 342/13; 342/14
(58) Field of Search ............................. 343/18 B, 18 C; 342/5, 8, 9, 10, 12, 13, 14

(56) References Cited

U.S. PATENT DOCUMENTS

| | | | | |
|---|---|---|---|---|
| 3,160,879 A | * | 12/1964 | Downing et al. | 342/56 |
| 3,530,469 A | * | 9/1970 | Dalley et al. | 342/10 |
| 3,727,229 A | * | 4/1973 | Clinger et al. | 343/706 |
| 4,307,665 A | * | 12/1981 | Block et al. | 102/505 |
| 5,049,883 A | * | 9/1991 | Woodward | 342/12 |

* cited by examiner

Primary Examiner—John B. Sotomayor
(74) Attorney, Agent, or Firm—Renner, Kenner, Greive, Bobak, Taylor & Weber

(57) ABSTRACT

A passive radar decoy comprises a substantially hemispherical upper body portion having its inner surface coated with an RF reflective material, a weighted nose piece, a tapered lower body portion interconnecting the upper body to the nose piece, an RF reflectively-coated corner reflector mounted coaxially within the upper body portion, and means to ram-air inflate the decoy when it is released from an aircraft in flight such that RF energy from a ground source of such energy impinges on the RF reflective surfaces to retro-reflectively return the RF energy back to the source and provide a scintillating and doppler frequency return and enhanced radar target cross section.

11 Claims, 2 Drawing Sheets

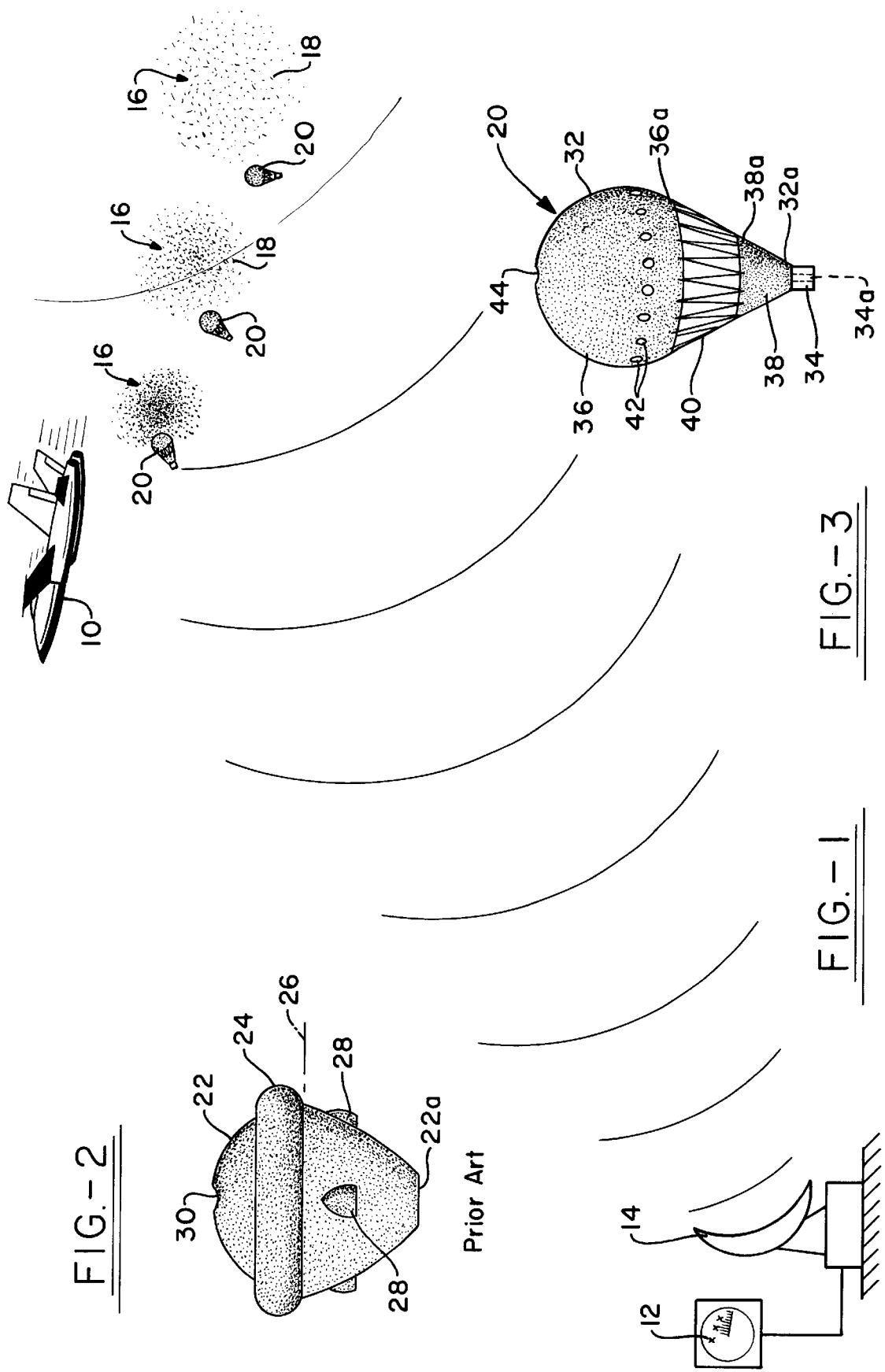

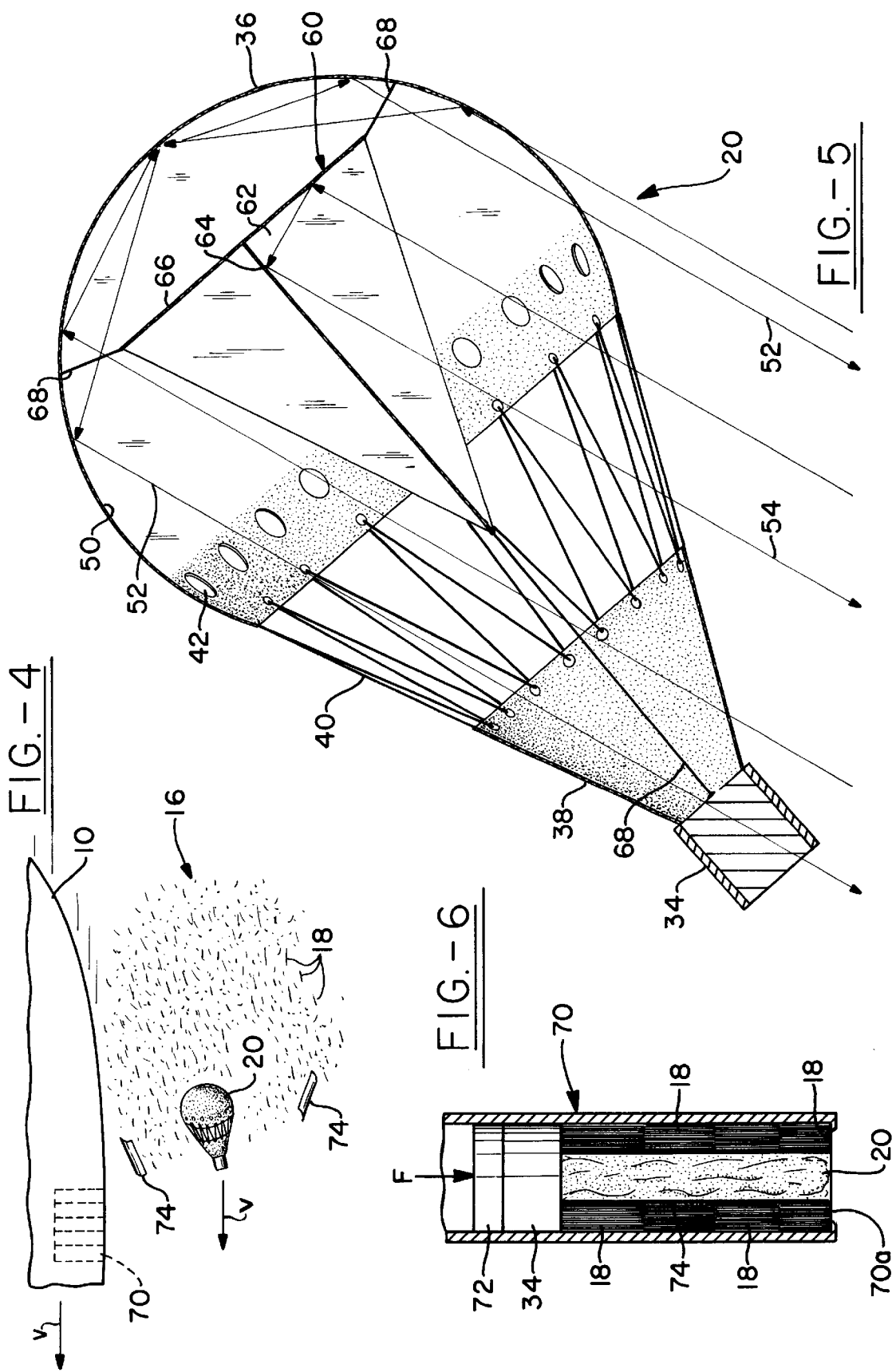

RAM-AIR INFLATED, PASSIVE DECOY FOR MILLIMETER WAVE FREQUENCIES

This invention is a continuation-in-part of prior application Ser. No. 06/378,313 filed May 14, 1982 now allowed entitled, "Ram-Air Inflated Passive Radar Decoy and Chaff Package Therefor."

BACKGROUND OF THE INVENTION

This invention generally relates to passive radar decoys and more particularly to a self-inflated aero-dynamic body incorporating a unique RF retro-reflective configuration for radar target enhancement and improved radar cross section at millimeter frequencies.

The use of chaff to defeat the radar function by denying it range and direction (azimuth and elevation) information is a well known and practiced technique in the art of radar jamming and/or countermeasures. Passive chaff elements in the form of discrete dipoles are dispensed by an aircraft to form a distince cloud which creates a credible false target to the ground-based radar. The dipoles are generally low mass slivers of metalized milar, glass, or other suitable dialectric material and these are very compactly and densely packaged into canisters and loaded into ejection equipment aboard the aircraft. The ejection equipment fire the chaff out of the canisters and into the aircraft windstream where vehicle-induced turbulence or wind shear effects are available for cloud dispersion. The low mass chaff slivers, upon being ejected, rapidly slow down and fall at an almost constant rate. For example, a widely used one mil metalized glass chaff has a settling rate of about 50 feet per minute.

One of the problems with present chaff systems is that the low mass slivers are easily damaged by the high compressive force necessary to eject them from the canister and into the aircraft windstream. Being compressed, the chaff dipoles may not uniformly disperse in the windstream and will therefore not provide the desired radar countermeasures performance.

Another problem with present chaff systems is the fact that the low mass slivers rapidly slow down upon ejection and therefore the useful life is shortened for lack of a doppler frequency return to the radar. Thus, the radar can update its return information and easily determine the location of the aircraft because of its doppler frequency.

It is in accordance with one aspect of the present invention, an object to provide a highly effective false target for enhancement of radar target cross section.

It is in accordance with another aspect of the invention, an object to provide a self-inflated, passive radar decoy that achieves coverage at millimeter wave frequencies and upon ejection from an aircraft provides a scintillating and doppler frequency return to a ground-based radar.

In accordance with still another aspect of the invention, it is an object to provide a ram-air inflated passive decoy that has a unique RF retro-reflective configuration for millimeter wave radar target performance.

The various aspects and advantages of the invention are met in a passive radar decoy comprising a substantially hemispherical upper body portion having an inner surface coated with an RF reflective material, a weighted nose piece, a tapered lower body portion interconnecting the upper body to the nose piece, an RF reflectively-coated corner reflector mounted coaxially within the hemispherically-shaped upper body portion; and means to ram-air inflate the decoy when it is released from the aircraft such that RF energy from a ground source of such energy impinges on the RF reflective surfaces to retro-reflectively return said RF energy back to the source of said energy and provide a scintillating and doppler frequency return and enhanced radar target cross section.

BRIEF DESCRIPTION OF THE DRAWINGS

FIG. 1 pictorially illustrates the application of the passive radar decoy concept comprising the instant invention;

FIG. 2 is an elevational view of a prior art inflatable decelerator, the basics of which are applied to this invention;

FIG. 3 is an elevational view of a preferred configuration for the passive decoy that meets the needs of this invention;

FIG. 4 illustrates the orientation of the decoy upon ejection from an aircraft in flight;

FIG. 5 is a sectional elevational view of the ram-air inflated decoy of this invention when in its operational configuration shortly after ejection from the aircraft; and FIG. 6 is a cross-sectional elevational view of the decoy as it may be packaged with chaff dipoles in an ejection canister.

DETAILED DESCRIPTION OF THE INVENTION

Referring to the drawings, FIG. 1 illustrates a radar countermeasures technique as may be employed by an aircraft 10 flying over a hostile territory to create false targets 12 to an enemy radar 14 by dispensing decoys 20 which effectively reflect radar energy to produce a target signal such as may be displayed at 12. In the usual practice, a plurality of chaff clouds 16 may also be ejected from the aircraft 10 so as to provide a number of false targets 12 and thus saturate defense radar discrimination and computation capacity.

In accordance with this invention, the signal frequency performance of the chaff elements 18 may be dramatically increased by dispensing at least one passive decoy 20, which by reason of its high reflectivity to millimeter wave RF energy, enhances the radar target 12 as seen by the enemy radar 14. More specifically, the decoy 20 is an aerodynamic body of the BALLUTE™ type capable of ram-air inflation. A typical configuration of the BALLUTE is illustrated in FIG. 2 which shows the external appearance of these type devices. Most notable of the features are a substantially hemispherical main body 22, a burble fence 24 about the hemispherical portion and slightly above the equator 26 of the body, ram-air inlets 28, and a ram-air exit port 30. Similar type BALLUTES are being used as retarding devices for bombs and as safety lowering devices for equipment and the like and are usually attached at the tapered forward end at 22a.

A preferred configuration for the decoy 20 is illustrated in FIGS. 3 and 5. The decoy 20 essentially comprises a substantially hemispherical main body portion 32 that tapers to a forward end 32a having a weighted nose piece 34. The weighted nose piece 34 may include a ram-air inlet 34a and whether or not it includes such inlet will depend upon what provisions are made for ram-air inflation of the body. For example, the decoy 20 of the preferred embodiment is made in two parts, a substantially hemispherical main body portion 36 and a tapered lower body portion 38, the upper and lower portions being connected about their peripheral edges 36a, 38a by a plurality of cords generally indicated at 40. In this configuration the separation of the body portions 36, 38 by the cords 40 allows for rapid ram-air entry into the body and inflation thereof immediately upon being ejected from the aircraft. While various other configurations of the BALLUTE body may be applied to this invention, the open body concept illustrated in FIG. 3 may be packaged into a smaller storage space and further is found to ram-air inflate in the shortest time over other configurations using ram-air inlets 28 as shown in FIG. 2. In any case, the decoy 20 is provided with a plurality of ram-air exit holes 42 about the main body portion 36 that function to bleed off excessive ram air and thus stabilize the aerodynamic operation of the body. An additional ram-air exit port 44 may be provided at the top of the hemisphere 36 in line with the body axis however test results indicate that such additional exit port may only be necessary in a fully enclosed BALLUTE body of the type illustrated in FIG. 2.

™ Goodyear Aerospace Corporation, Akron,. Ohio

The decoy body 20, comprised of portions 36, 38, may be made from any of a number of well-known materials including fabrics and films which are able to be packaged in a minimum of space while also being capable of rapid inflation and strong enough to accept the force of ram-air upon ejection from the aircraft.

The decoy 20 has for its primary purpose the ability to reflect millimeter wave RF energy and in this respect the interior surface 40 of the hemispherical body portion 36 is coated with an appropriate RF reflective material. It will be appreciated by those knowledgeable in the art that the hemispherical body provides an ideal geometrical configuration for the return of the "glory rays" 52 of the incoming radar as illustrated in FIG. 5. In this respect, the diameter of the hemisphere 36 is chosen so as to cover the millimeter frequency range of the incoming radar to be reflected.

For example, a 12-inch diameter hemisphere will reflect RF energy in the frequency range of 36 GHZ and again at about 95 GHZ.

Mounted within the hemispherical body portion 36 is a second RF reflective member 60 comprised of two orthogonally intersecting triangular planes 62, 64 which are mounted on a substantially square shaped base 66. The combination of the elements 62, 64, 66 comprise a three dimensional reflector 60 that represents a very strong radar target due to the inherent backscattering gain accomplished by this type configuration. As illustrated in FIG. 5, the return 54 provided by the corner reflector 60 is additive and combines with the "gloryray" return of the hemispherical portion and a phase difference is exhibited between them. The addition of the two radar returns will produce the requisite scintillating signal needed to successfully simulate the radar echo of the aircraft 10. Of course, the corner reflector 60 may be made from numerous and various materials that may be coated with a radar reflective film. For example, extremely light weight but strong fabrics, films, and crushable foams are available and any of these materials may be applied to this application. The corner reflector 60 may also be mounted within the hemispherical portion 36 by various means such as for example cords 68. The exact position and location of the cords 68 may vary and the inventive concept is not considered limited by the manner of such mounting.

FIG. 6 illustrates the packaged configuration of the decoy 20 and chaff 18 as these may be mounted in an ejection canister or tube 70 aboard the aircraft 10. The canister 70 includes a piston 72 at one end thereof for forceful ejection of the contents of the tube out of the opposite end 70a. The decoy 20 is mounted within an inner tube 74 with the weighted end 34 positioned at either end of the tube. As shown in the embodiment illustrated in FIG. 6 the weight 34 may be positioned adjacent the piston 72 and the inner tube 74 abuts the weight 34. In this circumstance, a force F on the piston 72 is transmitted to the weight 34 and tube 74 and not to the crushable contents of the canister 70 which includes chaff elements 18. The chaff elements 18 are cut to various lengths to cover a specific range of RF frequencies and are densely packaged between the inner tube 74 and the walls of the canister 70. The alternative packaging arrangement, i.e., the weight 34 at the opposite end of the canister 70, is described in the prior application referenced earlier in this specification.

Irrespective of the mounting arrangement within the ejection tube 70, the decoy 20 will reach its most advantageous orientation with respect to the search radar 14 almost immediately upon being ejected. FIG. 4 illustrates ejection of the decoy-chaff package from an aircraft 10. At the time of ejection, the weight 34 is moving at substantially the same velocity "v" and in the same direction as the aircraft 10, and ram-air inflation of the hemispherical portion 36 of the decoy body will provide a doppler and scintillating frequency return signal to the radar 14 that is a credible false target. Because the trajectory of the decoy 20 is in the same direction as the aircraft 10, it provides a doppler frequency return for at least 0.5 seconds after ejection. Thereafter trajectory falloff is quite sharp and its useful life from a practical countermeasures standpoint is terminated. However, the useful life is sufficiently long to fool the radar and additional decoy/chaff packages may be ejected to, continue to decoy the radar.

While certain representative embodiments and details are shown for the purpose of illustrating the invention, it will be apparent to those skilled in this art that various changes and modifications may be made thereto without departing from the spirit or scope of the invention.

What is claimed is:

1. A passive radar decoy for deployment from an aircraft in flight comprising:
    a substantially hemispherical upper body portion having an inner surface coated with an RF reflective material;
    a weighted nose piece;
    a tapered lower body portion interconnecting the upper body portion to the nose piece;
    a corner reflector comprised of two orthogonally intersecting triangular planes mounted coaxially within the hemispherical upper body portion, the bases of the triangular planes connected to a substantially square base from corner to corner thereof; and
    means to ram-air inflate the decoy when it is released from the aircraft such that RF energy from a ground source of such energy impinges on the RF reflective surfaces to retro-reflectively return said RF energy back to the source of said energy.

2. The passive decoy as set forth in claim 1 wherein the upper and lower body portions are interconnected by a plurality or cords forming a circumferential opening in the decoy that effects ram-air inflation of the decoy body.

3. The passive decoy as set forth in claim 2 wherein a plurality of holes are provided in the periphery of the upper body to provide an exit for ram-air and to stabilize the decoy in flight.

4. The passive decoy as set forth in claim 1 wherein the upper hemispherical body portion has a diameter such as to effectively reflect RF energy at frequencies above 20 GHZ.

5. The passive decoy as set forth in claim 1 wherein the means to ram-air inflate the decoy comprises a plurality of side scoops positioned about the hemispherical upper body and a bore provided through the nose piece to direct ram-air into the decoy and inflate it upon release from the aircraft.

6. The passive decoy as set forth in claim 5 further including a burble fence positioned circumferentially about a diameter of the decoy to provide stabilization of the decoy in flight.

7. A configuration for a radar countermeasures package for deployment from an aircraft in flight having a radar countermeasures system including an ejection tube having a force-driven piston therein to effect expulsion of the contents of the tube into the atmosphere in response to a radar countermeasures requirement due to the presence of an enemy ground-based radar comprising in combination:

a segmented tube mounted coaxially within the ejection tube;

a plurality of chaff dipoles stowed within the ejection tube, between it and the segmented tube; and a ram-air inflatable, passive radar decoy stowed within the confines of the segmented tube and comprising a substantially hemispherical upper body portion having an RF energy reflectively-coated inner surface, a weighted nose piece, a tapered lower body portion interconnecting the upper body portion to the nose piece, and an RF reflectively-coated corner reflector coaxially mounted within the hemispherically-shaped upper body portion;

said segmented tube, chaff dipoles, and passive decoy being expelled from the ejection tube and into the atmosphere to provide an enhanced radar cross-section and a scintillating and doppler frequency return to the ground-based radar upon dispersion of the chaff dipoles and inflation of the decoy.

8. The countermeasures package as set forth in claim 7 wherein the weighted nose piece of the decoy has a diameter substantially that of the bore of the ejection tube and is positioned in the tube at the end opposite the piston and said segmented tube has a length such that it abuts the nose piece at one end and abuts the piston at the opposite end such that the force which drives the piston is imparted to the segmented tube and nose piece and not to the chaff upon forceful expulsion of the package from the ejection tube.

9. The countermeasures package as set forth in claim 7 wherein the weighted nose piece of the decoy has a diameter substantially that of the bore of the ejection tube and is positioned in the-tube adjacent the piston and said segmented tube is-positioned to abut the nose piece such that the force which drives the piston is imparted to the nose piece and segmented tube and:not to the chaff upon expulsion of the package from the ejection tube.

10. The countermeasures package as set forth in claim 7 wherein the upper and lower body portions of the decoy are separated by a plurality of cords to provide for rapid ram-air inflation of the decoy.

11. The countermeasures package as set forth in claim 7 wherein the corner reflector comprises two orthogonally intersecting triangular planes mounted on a substantially square base from the corners thereof, said corner reflector mounted coaxially within the hemispherical body portion by a cord attached between the inside of the upper body portion and each corner of the base and by a cord attached between the intersecting triangular planes and the nose piece.

* * * * *